United States Patent [19]

Shane

[11] Patent Number: 4,649,595
[45] Date of Patent: Mar. 17, 1987

[54] RESILIENTLY MOUNTED CASTER HAVING A PIVOTALLY MOUNTED INNER BODY MEMBER

[75] Inventor: Robert M. Shane, Berrien Springs, Mich.

[73] Assignee: Shepherd Products U.S. Inc., St. Joseph, Mich.

[21] Appl. No.: 782,936

[22] Filed: Oct. 2, 1985

[51] Int. Cl.⁴ .............................................. B60B 33/00
[52] U.S. Cl. ..................................... 16/18 CG; 16/44; 16/47
[58] Field of Search .................. 16/18 CG, 44, 47, 48

[56] References Cited

U.S. PATENT DOCUMENTS

| | | | |
|---|---|---|---|
| 1,745,992 | 2/1930 | Herold | 16/44 |
| 4,219,904 | 9/1980 | Melara | 16/47 |
| 4,485,521 | 12/1984 | Welsch et al. | 16/44 |

FOREIGN PATENT DOCUMENTS

| | | | |
|---|---|---|---|
| 860352 | 2/1961 | United Kingdom | 16/44 |
| 1428451 | 3/1976 | United Kingdom | 16/47 |

Primary Examiner—Fred Silverberg
Attorney, Agent, or Firm—Mann, McWilliams, Zummer & Sweeney

[57] ABSTRACT

A resiliently mounted dual wheel caster is provided which includes an outer body including a hub with a transverse aperture, and an inner body member pivotally mounted to the outer body and mountable to an article to be supported by the caster. A resilient shock absorbing member is disposed between the inner body and the hub of the outer body. An axle is disposed through the aperture in the hub and resilient wheels are mounted one each end of the axle. The resilient wheels and the resilient member act in series to effectively absorb shock encountered by irregularities in travelled terrain and prevent such shock from reaching the supported article.

6 Claims, 4 Drawing Figures

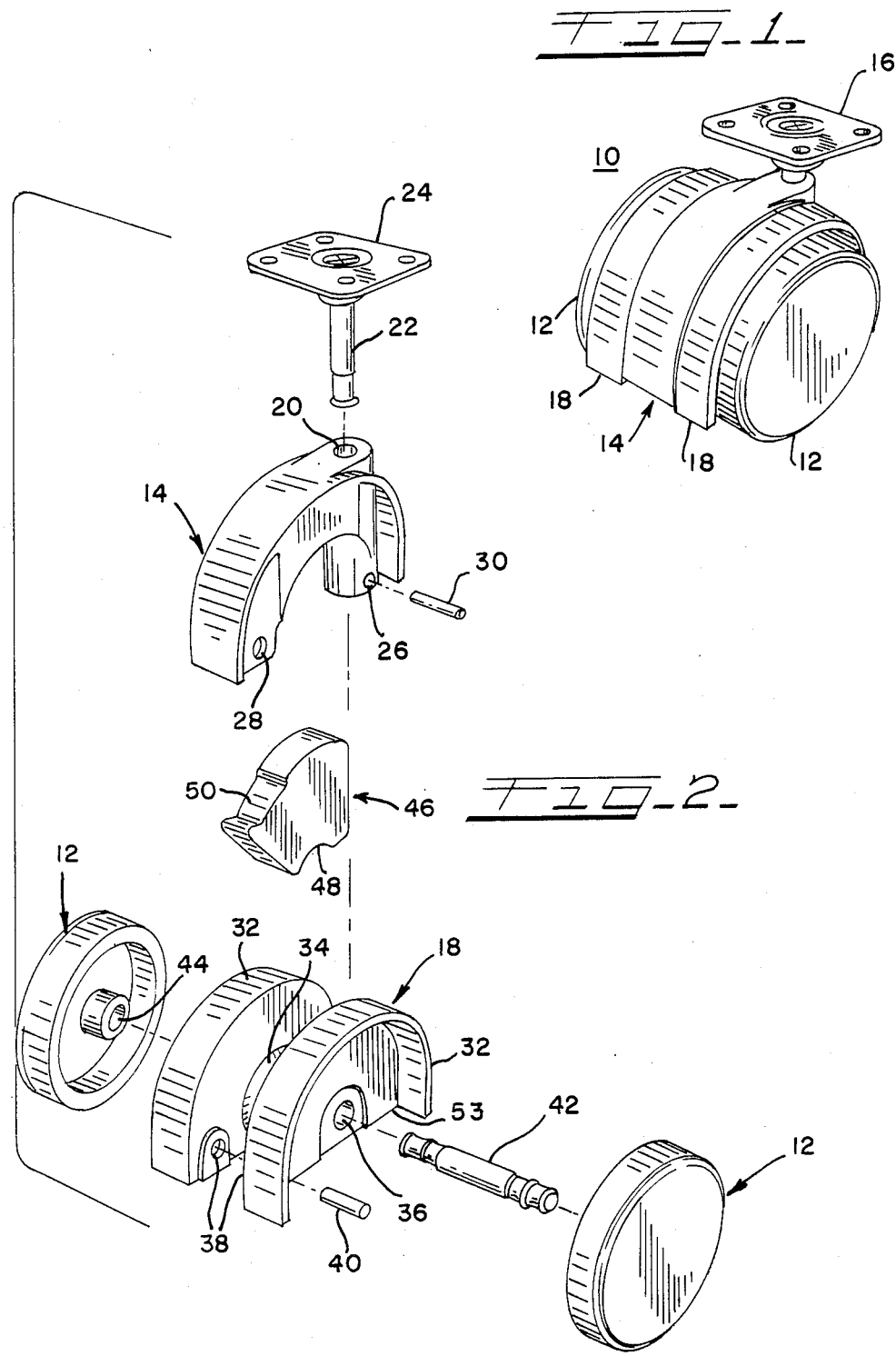

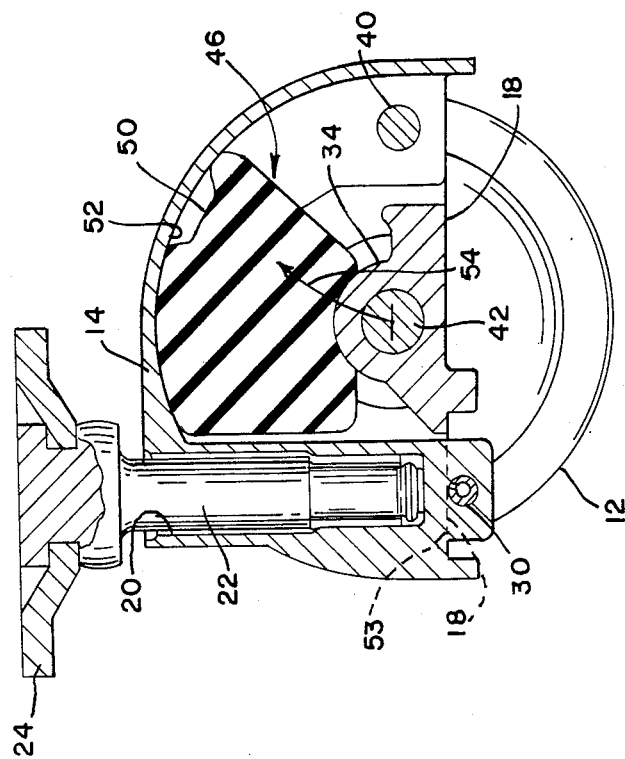
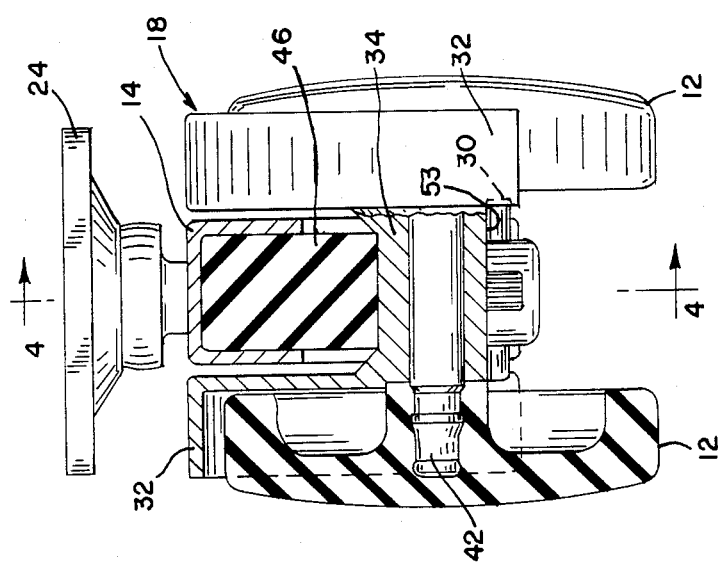

RESILIENTLY MOUNTED CASTER HAVING A PIVOTALLY MOUNTED INNER BODY MEMBER

BACKGROUND OF THE INVENTION

1. Field of the Invention

This invention is related to the field of wheeled casters for attachment to articles of furniture and the like. Such casters exhibit shock absorbing qualities to isolate these supported articles from shock.

2. Description Of The Prior Art

There have been provided in the past a number of caster assemblies, both single and dual wheeled variety. Some of these have been provided with shock absorbing properties, but these present the problems of increased caster mounting height and the necessity for the provision of initial wheel clearance which results in different appearance in loaded and unloaded states.

For instance, Herold U.S. Pat. No. 1,745,992 discloses a resilient block mounted above and ahead of a caster wheel, between a wheel yoke and mounting member.

Herold U.S. Pat. No. 2,285,656 shows a resilient mounting arrangement for a truck caster in which a cushioned device is mounted between the torsion joint assembly and the wheel structure.

Suttles U.S. Pat. No. 2,442,831 discloses a wheel mounting fork which is connected to a mounting stud through a resilient block.

Robinson et al. U.S. Pat. No. 2,830,545 relates to a heavy duty caster construction having a resilient block located between upper and lower mounting plates to allow the single caster wheel to move through a range of motion.

The patent of Melara U.S. Pat. No. 4,290,166 describes an arrangement in which a coil spring is disposed between an axle and the housing to urge the shaft into frictional engagement with the projections.

Welsch U.S. Pat. No. 4,346,498 discloses the use of a resilient spacer mounted between a wheel yoke and an upper mounting member.

Black U.S. Pat. No. 4,462,138 describes a bracket for supporting a caster in which a resilient element is disposed between an upper housing supporting the load and a lower housing which carries the axle and wheels.

Welsch et al. U.S. Pat. No. 4,485,521 illustrates a caster having a resilient member mounted above the caster wheel.

SUMMARY OF THE INVENTION

This invention relates to a dual wheel caster arrangement having resilient means arranged in series to isolate an associated article of furniture from shock and vibration caused by irregularities in the travelled terrain.

The resilient members include a pair of deformable wheels mounted to either end of an axle carried by a hub in an outer body which also includes wheel shrouds to partially surround the wheels.

In order to further isolate the furniture from the irregularities of the terrain, a deformable resilient block member is interposed between an inner member and the outer body. The inner body and outer body are pivotally connected at the back of the system. This block acts as a resilient means in series with the resilient caster wheels to further cushion the supported furniture. Since the caster assembly is mounted at its forward end to the furniture and the inner and outer bodies are pivotally connected at the rear of the unit, maximum deflection of the outer body from the inner body is provided with resultant maximum vertical travel at the attachment point of the caster unit to the furniture.

A pin is provided extending through the inner body and disposed underneath the outer body to maintain a preload on the elastic block and to limit the engagement of the inner and outer bodies. This acts to maintain a predetermined mounting height of the caster and to prevent the deflection of the block under the normal weight of the supported body at rest.

DESCRIPTION OF THE DRAWINGS

The foregoing structure as hereinbefore referred to is illustrated in the accompanying drawings wherein FIG. 1 is a general perspective view of a caster embodying the present invention.

FIG. 2 is a perspective exploded view of the caster shown in FIG. 1.

FIG. 3 is a rear view partially cut away vertically.

FIG. 4 is a cross sectional view taken on the line 4—4 of FIG. 3.

DESCRIPTION OF THE PREFERRED EMBODIMENT

The assembled caster apparatus which embodies this invention is shown in FIG. 1 where the caster is indicated generally as 10. The caster includes caster wheels 12, inner body 14, mounting plate 16 and outer body 18. One composition of the tread material used for caster wheels 12 which has proven satisfactory is thermoplastic polyurethane.

The exploded view of FIG. 2 shows the individual parts of the caster unit and their interrelationship.

Inner body 14 includes vertical socket 20 which receives mounting spindle 22. Mounting spindle 22 may be either fixed or rotatable within socket 20 and is fixed at its upper end to mounting plate 24. Also defined in inner body 14 are stop pin aperture 26 and pivot pin aperture 28. Stop pin aperture 26 is adapted to receive pin 30.

Outer body 18 includes shrouds 32 and hub 34, through which transverse axle aperture 36 extends. A pair of pivot pin apertures 38 are provided in outer body 18 to align with pivot pin aperture 28 in inner body 14 and to receive pivot pin 40 thereby pivotally joining inner body 14 and outer body 18.

Axle 42 is press fitted into axle aperture 36 in hub 34 and wheels 12 are rotatably mounted to either end of axle 42 at axle sockets 44.

Elastic block 46 is made of any suitable elastomeric material of sufficient compression resistance to maintain the constant ride height under normal conditions. One material which has been utilized successfully is chloroprene rubber. The block 46 is provided with hub recess 48 to mate with hub 34. Block 46 is also provided with circumferential recess 50.

FIGS. 3 and 4 show the caster in sectional view, as assembled. In FIG. 3, wheels 12 are shown attached and rotatable with respect to axle 42. Each of the shrouds 32 is in partial surrounding relationship to one of the wheels 12 which are of suitable elastomeric material to absorb minor irregularities in travelled terrain by corresponding indentation of the wheels' circumferential surface. A constant clearance between the outer surface of the wheel and the shroud 32 is occasioned by the unitary construction of the shrouds with the hub 34. This provides a pleasing, uniform appearance.

FIG. 4 is a side cross sectional view of the caster taken substantially along the central axis of travel. In this view, hub portion 34 of outer body 18 is shown, with axle 42 inserted therein. Inner body 14 and outer body 18 are pivotally connected at pivot pin 40, at the rear portion of the caster. Resilient block 46 is compressed between hub 34 of outer body 18 and inner surface 52 of inner body 14.

Stop pin 30, inserted in inner body 14 through aperture 26, engages the lower wall 53 of outer body 18 (shown in phantom in this figure) to maintain the block 46 in a state of compression and to retain a minimum predetermined degree of engagement between the inner and outer bodies. In this fashion, the resilient block cannot decompress. This provides a predetermined mounting height for the caster and this preload is determined to prevent substantial further compression of the block under the normal weight of the supported body in a quiescent state.

As the caster wheels roll along travelled terrain, they encounter physical discontinuities, resulting in a tendency of the wheels to follow such undulations. The resilient wheels of the present invention are designed to absorb some of the shock which results. Some of the remaining nonabsorbed impact creates forces on the wheel axle which transmit these forces through the hub to the elastic block which, in effect, is connected in series with the resilient wheels. The elastic block is then deflected, such deflection acting to prevent the transmission of some of these forces to the inner body of the caster and thus to the body mounted on the caster.

The elastic block 46 is shaped to facilitate deflection in the direction indicated as 54 which is the arc travelled by hub 34 upon encountering an irregularity in the terrain, as the hub pivots around pivot pin 40. Recess 50 provides space for deflection of the block along this path.

Since the inner and the outer bodies 14 and 18 are pivotally connected at the rear of the unit by pivot pin 40 and the mounting platform is located at the front of the unit on spindle 22 and socket 20, maximum deflection and vertical travel is provided at the furniture mounting point. The mass of the wheels and the outer bodies assemblage is relatively low resulting in a low inertial resistance to motion. On the other hand, the inertia of the inner body assemblage and its associated piece of furniture is relatively high, assuring that irregularities in the travelled terrain will cause deflection of the caster wheels without undue disturbance of the furniture.

Various features of the invention have been particularly shown and described in connection with the illustrated embodiment of the invention, however, it must be understood that this particular arrangement merely illustrates and that the invention is to be given its fullest interpretation within the terms of the appended claims.

What is claimed is:

1. A resiliently mounted dual wheel caster including an outer body member including a hub defining an aperture therethrough; an axle disposed through said aperture in said hub; a pair of shrouds attached to said hub, one disposed on either side of said hub; a pair of wheels, one attached at each end of said axle, each wheel disposed outwardly of and in partially enclosed relationship with each shroud; an inner body member pivotally connected to said outer body member at one end thereof and disposed between said shrouds, said inner body member including means adapted to connect said inner body member to an article to be supported by said caster; a resilient shock absorber disposed between said inner body member and said hub between said wheels to dampen the shock encountered by the wheels and reduce the forces transmitted to the article to be supported.

2. A resiliently mounted dual wheel caster as in claim 1 wherein said shock absorber is a block of elastomeric material.

3. A resiliently mounted dual wheel caster as in claim 2 wherein said block defines a recess adjacent to said inner body into which said block may be deflected upon transmission of force from said wheels to said block.

4. A resiliently mounted dual wheel caster as in claim 1 wherein said inner body member and said outer body member are pivotally connected at the rear of said caster unit and said means adapted to connect said inner body member to said article to be supported by said caster is located at the front of said caster.

5. A resiliently mounted dual wheel caster as in claim 1 wherein means is provided to maintain a predetermined degree of engagement between said inner body and said outer body and to maintain a preload on said shock absorber.

6. A resiliently mounted dual wheel caster as in claim 5 wherein said means for maintaining engagement between said inner and outer bodies comprises a pin fitted to said inner body and abutting said outer body.

* * * * *